L. A. YOUNG AND W. MILLER.
PULLEY.
APPLICATION FILED JULY 10, 1918.

1,309,675.

Patented July 15, 1919.

Inventor
Leonard A. Young &
William Miller
By Stuart O. Barnes
Attorney

UNITED STATES PATENT OFFICE.

LEONARD A. YOUNG AND WILLIAM MILLER, OF DETROIT, MICHIGAN; SAID MILLER ASSIGNOR TO SAID YOUNG.

PULLEY.

1,309,675.   Specification of Letters Patent.   Patented July 15, 1919.

Application filed July 10, 1918. Serial No. 244,136.

*To all whom it may concern:*

Be it known that we, LEONARD A. YOUNG and WILLIAM MILLER, citizens of the United States, residing at Detroit, county of Wayne, State of Michigan, have invented a new and useful Improvement in Pulleys, of which the following is a specification.

This invention relates to pulleys and has for its object an improved means for fastening a pulley to a shaft.

In the drawings,—

The pulley is here shown constructed of laminated wood but the material used is immaterial. It is preferably made with a removable section $a$ having a mortise and tenon engagement $b$, when the section is slid into place and it is held from endwise movement by the set screw $c$. This enables the pulley to be slipped onto the shaft between the supporting brackets.

Figure 1:
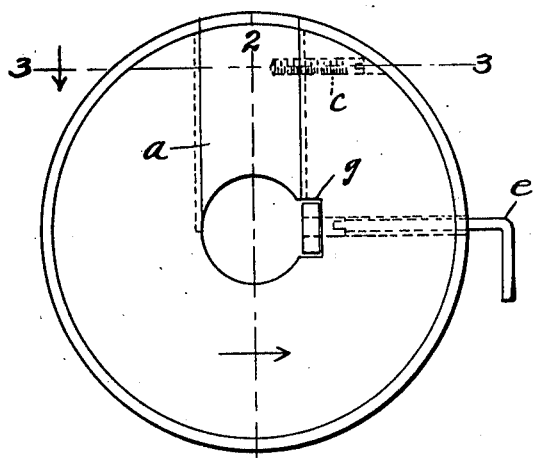
Figure 1 is a side elevation of the pulley.
Figure 2:
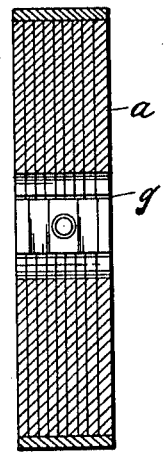
Fig. 2 is a section on the line 2—2 of Fig. 1.
Figure 3:
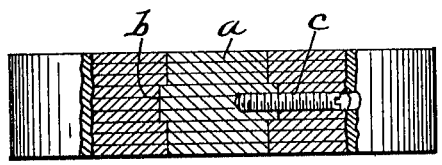
Fig. 3 is a section on the line 3—3 of Fig. 1.
Figure 4:
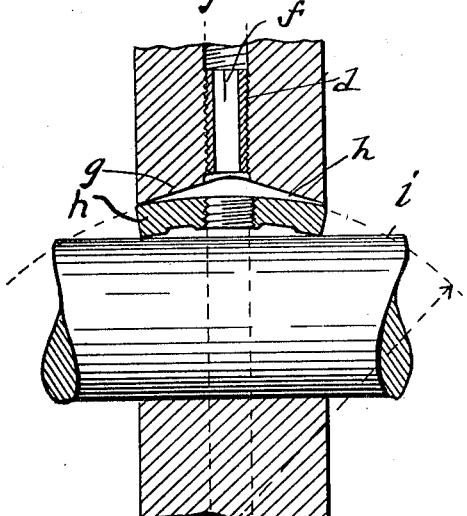
Fig. 4 is a sectional detail of the fastening means.
Figure 5:
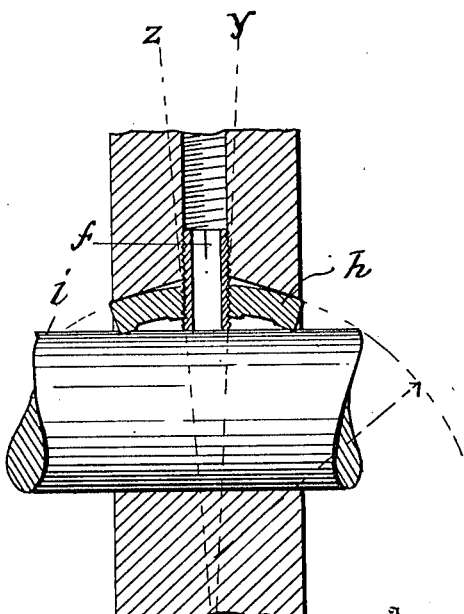
Fig. 5 is a sectional detail of the fastening means showing the same operated to bite into the pulley shaft.

In Figs. 4 and 5 is shown the improved pulley fastening means. The pulley has a radial bore in which engages the tubular screw $d$. The screw is tubular so that a key or crank $e$ may be fitted into its squared end $f$. This allows the use of a screw adapted to take a tool that gets a better purchase than a screw-driver and yet does not require a bore of large diameter as would be the case if the ordinary bolt were used in connection with a socket wrench. A small bore is desirable as it leaves only a small hole in the periphery of the pulley and does not weaken the pulley as would a large bore.

The central aperture of the pulley at the inner end of the bore is provided with a rectangular slot or offset $g$, whose inner wall is concaved as shown in Figs. 4 and 5. This is adapted to take a rectangular and bowed spring nut $h$. However, normally the radius of the bow of the spring nut would be considerably greater than the radius of the concaved wall of the slot $g$ (compare the two in Fig. 4). However, when the screw $d$ is turned down into the threads of the spring nut, this nut is restrained from movement. Consequently the tubular screw passes through until it strikes the shaft $i$, as shown in Fig. 5. Of course, it is then held from further movement unless it can bite into the shaft slightly. Inasmuch as the spring nut $h$ is held from turning movement, the tendency now is for the nut to travel backward on the screw. However, it is held from such movement by reason of the contact between the pulley substance and the ends of the nut (Fig. 4). But, by reason of the different and intersecting arcs (Fig. 4) furnished by the concavity of the inside wall of the slot and the bow of the nut, there is a free space between the center of the nut and the center of the inside wall of the slot. This allows the further turning movement to raise the center of the nut with respect to the ends; in other words, bow the nut more. This action has two very important effects. First, it curls the spring nut, so to speak, so that the ends of the nut bite into the shaft, as shown in Fig. 5. Preferably these portions of the nut are case hardened so as to do this biting, while the nut itself is made of spring metal calculated to withstand this distortion and when the distorting force is removed, return to the normal position. The second important function of this spring nut is that by this bowing operation the nut is effectively locked upon the screw so that the arrangement is also a nut lock. Obviously the bowing of the nut will cause the parallel walls of the threaded aperture to leave their parallel relation on the two sides facing the ends of the nut. This is illustrated roughly by the lines Z—Z and Y—Y of Fig. 5. Obviously at the same time the other two sides of the threaded aperture will be caused to approach near each other by reason of the bowing of the spring nut. In a word, this bowing of the center of the nut by reason of the action of the screw and the holding of the ends of the spring nut, is bound to distort the female thread, and consequently cause the threads to bind more the farther the nut is distorted, and thereby lock it in this position. This secures a very effective fastening of the pulley to the shaft by a three-point contact and in a way to lock the parts in their contacting positions.

What we claim is:

1. A device for fastening a member to a shaft, comprising the said member provided with an aperture for the shaft, said shaft, a spring piece or plate held by the said member from rotation and having its ends held from movement, and means for bowing the spring piece or plate to cause the ends of the same to bite into the shaft.

2. In a device for fastening a member to a shaft, the combination of the said member, the said shaft, a nut having its ends held from movement and also held from rotation, and a screw passing through the nut and adapted to bear against the shaft to distort the center of the nut and bow the same out to cause the ends of the nut to bite into the shaft as well as does the screw.

3. In a device for fastening a member to a shaft, the combination of the said member, the said shaft, a nut held at its ends from movement and also held in non-rotative position, and a screw having a squared outer aperture passing through the said nut and when bearing against the shaft adapted to distort the center portion of the nut to cause the ends to bite into the shaft as well as does the screw.

4. A device for fastening a member to a shaft, comprising the said member, the said shaft, the said member being provided with a rectangular offset from its center aperture which has a concaved inner wall and provided with a bore leading into said rectangular offset, a spring nut fitted into said offset so that its ends contact the concaved wall of the offset and so that its center portions are spaced from the concaved wall of the offset, and a screw passing through the said bore in the member and engaging the threads of the nut so that when the screw strikes the shaft it causes the spring nut to bow and drives the ends of the nut into the shaft.

5. A device for fastening a member to a shaft, comprising the said member provided with an aperture for the shaft, the said shaft, a spring piece or plate engaging non-rotatably with the said member, and means for causing the said spring piece or plate to engage against the said member to assume a bowed condition so that the ends are caused to bite into the shaft.

In witness whereof we have hereunto set our hands on the 29 day of June 1918.

LEONARD A. YOUNG.
WILLIAM MILLER.

Copies of this patent may be obtained for five cents each, by addressing the "Commissioner of Patents, Washington, D. C."